United States Patent

Baatz

Patent Number: 5,336,016
Date of Patent: Aug. 9, 1994

[54] RUBBER VEHICULAR IMPACT BARRIER

[76] Inventor: Guenter A. Baatz, 33 Pioneer Tower Road, Kitchener, Ontario, Canada, N2G 3W6

[21] Appl. No.: 118,301

[22] Filed: Sep. 9, 1993

[51] Int. Cl.⁵ .................................................. E01F 15/00
[52] U.S. Cl. .......................................... 404/6; 256/13.1
[58] Field of Search ............................ 404/6, 7, 8, 9, 10, 404/32; 256/13.1; 264/122, 126

[56] References Cited

U.S. PATENT DOCUMENTS

| | | |
|---|---|---|
| 3,317,189 | 5/1967 | Rubenstein . |
| 3,661,359 | 5/1972 | Walker . |
| 3,764,446 | 10/1973 | Martin . |
| 3,848,853 | 11/1974 | Way et al. . |
| 3,928,701 | 12/1975 | Roehner . |
| 3,934,540 | 1/1976 | Bruner et al. . |
| 3,951,384 | 4/1976 | Hildreth, Jr. . |
| 4,022,434 | 5/1977 | Moore . |
| 4,022,452 | 5/1977 | Dupre . |
| 4,030,706 | 6/1977 | Ward . |
| 4,062,521 | 12/1977 | Moreau . |
| 4,066,244 | 1/1978 | Yoho . |
| 4,090,694 | 5/1978 | Vincent . |
| 4,113,400 | 9/1978 | Smith ..................... 256/13.1 X |
| 4,183,505 | 1/1980 | Maestri . |
| 4,186,913 | 2/1980 | Bruner et al. . |
| 4,244,841 | 1/1981 | Frankland ..................... 260/2.3 |
| 4,288,061 | 9/1981 | Moreau . |
| 4,307,876 | 12/1981 | Cleaves . |
| 4,312,600 | 1/1982 | Schaaf et al. . |
| 4,366,284 | 12/1982 | Ishido et al. ..................... 524/447 X |
| 4,481,335 | 11/1984 | Stark, Jr. ..................... 525/261 |
| 4,726,530 | 2/1988 | Miller et al. ..................... 241/24 |
| 4,785,577 | 11/1988 | Lederbauer . |
| 4,970,043 | 11/1990 | Doan et al. ..................... 264/237 |
| 5,106,554 | 4/1992 | Drews . |
| 5,122,008 | 6/1992 | Drews . |
| 5,125,762 | 6/1992 | Srassil . |
| 5,156,486 | 10/1992 | Davidson . |
| 5,199,813 | 4/1993 | Nagler . |
| 5,238,734 | 8/1993 | Murray ..................... 428/292 |

FOREIGN PATENT DOCUMENTS 431594  8/1967  Switzerland ..................... 256/13.1

*Primary Examiner*—Ramon S. Britts
*Assistant Examiner*—James A. Lisehora
*Attorney, Agent, or Firm*—Riches, McKenzie & Herbert

[57] ABSTRACT

This invention relates to a method of manufacturing a homogeneous solid rubber vehicular barrier, comprising the steps of: mixing and knead melting a mixture of: 80 to 90 percent by weight particles of recycled waste rubber; 10 to 20 percent by weight virgin rubber; and an accelerator composition; forming the mixture in a mould to a selected barrier configuration thus forming a barrier; curing the mixture within the mould at a temperature of 250° to 450° C. at a pressure of 500 to 1000 psi for a period of time from 1.5 to 7.5 hours; and removing the cured barrier from the mould. A homogeneous moulded solid rubber vehicular barrier, is thereby formed of 80 to 90 percent by weight particles of recycled waste rubber in a matrix of 10 to 20 percent by weight virgin rubber. The completed barrier has a finished outer surface of cured uncontaminated rubber, and has a Shore hardness of between 65 and 70.

14 Claims, 1 Drawing Sheet

RUBBER VEHICULAR IMPACT BARRIER

FIELD OF THE INVENTION

The invention relates to a rubber vehicular impact barrier, for use as highway median or curb barriers for example, and particularly a solid rubber barrier constructed containing 80-90 percent recycled waste rubber.

BACKGROUND OF THE INVENTION

Highways and racetracks are often constructed with temporary or permanent barriers to contain and direct vehicles that have lost control. Conventionally the barriers are massive concrete walls which are either formed in place or are prefabricated in interlocking modules. The modules may be prefabricated in a concrete manufacturing facility and transported to the erection site to be lifted into place with cranes or forklift trucks.

An advantage of modular systems is that they can be used during highway construction to protect workers and equipment on a temporary basis, as well as in permanent installations. When the barriers are no longer required the modules may be reused in other locations. When a module is damaged it can be easily removed and replaced.

Typically conventional highway barrier modules include means to interconnect modules in a longitudinal series. One preferred conventional interconnecting means is a vertical tongue and groove however mechanical connections, such as bolts, are also used in permanent installations.

The size and weight of conventional barrier modules is such that they may be placed directly upon paved surfaces and do not require any anchoring to the surface in order to resist lateral impact loads from vehicles. The weight of the modules, interconnected with other like modules, provides inertial resistance and frictional resistance to sliding on their bases, thus preventing vehicles from crashing through the barriers into adjacent lanes of traffic or into highway ditches.

The use of concrete barrier modules is fairly widespread since they are durable and relatively inexpensive to construct. Abrasion between an impacting metallic vehicles creates sparks which often ignites the fuel of the vehicle which is spilled upon impact with the barrier. The danger of sparks is particularly significant due to the increased use of propane and natural gas as a fuel for vehicles. In the future it is also very likely that explosive hydrogen gas will be used to fuel significant numbers of vehicles.

A vehicle which looses control and crashes into a concrete barrier therefore may leak significant amounts of fuel. The vehicle may be abraded against the concrete barrier for an appreciable distance thereby creating sparks which may ignite the spilled fuel.

A further distinctive disadvantage of conventional concrete highway barriers is the rigidity of the concrete. An impacting vehicle often merely bounces off the rigid barrier and spins out of control into adjacent vehicles causing further accidents.

The concrete barrier does not yield and therefore the occupants of the impacting vehicle are protected from abrupt deceleration only by the collapsing action of their metal vehicle. Modern vehicles are often designed to absorb the impact of collision by folding up or collapsing the fenders or bumpers of the vehicle. The conventional concrete barrier does not aid in reducing the deceleration forces upon vehicle occupants.

To address the problems with rigid barriers, impact dispersing, or yielding non-rigid highway barriers are used on a widespread basis. Plastic barrels filled with sand are used to dissipate the deceleration forces upon impact around bridge abutments or other structures adjacent to highways. Sheet metal median barriers are also constructed which are filled with sand and deform under impact to dissipate the deceleration forces. W-shaped or closed box shaped sheet metal railings are also used supported on detachable pedestals.

Such impact dispersing or deformable barriers must be dissambled and rebuilt after an impact. Although the cost of maintaining such barriers is higher than a rigid concrete barrier, the deformable barriers often do not result in a vehicle merely bouncing off of the them into adjacent traffic. Deformable barriers are also often less expensive to initially construct.

Deformable rubber barriers have also been proposed with limited success. A common form of barrier is constructed of discarded automobile tires stacked or arranged in various configurations to absorb the impact of colliding vehicles. For example: U.S. Pat. No. 4,785,577 to Lederbauer; 4,066,244 to Yoho; and 3,951,384 to Hildreth Jr., all disclose various barriers constructed of complete discarded tire carcasses assembled into various configurations.

A distinct disadvantage of such conventional rubber barriers is that they are generally unsightly since they look like stacks of discarded automobile tires. The appearance of these barriers may not be a concern when used at a racetracks however for highway construction there suitability is minimal.

Waste tires present significant disposal problems. The waste tires are often stock piled in huge dumps which present a fire hazard.

Discarded automobile tires have been recycled successfully in various ways. Worn tires are ground or shredded and the rubber particles have been added to asphalt compositions, or have been bound together with polyurethane binders to create resilient pavements. One example of a resilient pavement is disclosed in U.S. Pat. No. 4,492,728 to Zurkinden. The resilient pavements are used to cover track and fields sports tracks and outdoor playground areas for example.

In such applications it is necessary that the binding and curing of the composition be carried on outdoors without special heating or humidity requirements.

A distinct disadvantage of using automobile tires in asphalt, or resilient pavement for sports facilities or playgrounds is that the metal wire reinforcement found in waste automobile tires must be first removed from the shredded rubber. The shredded rubber therefore must be ground to a fine particle size and passed over magnetic belts or other process machinery to remove the minute wire particles.

The additional cost and time taken to perform the metal removal adds to the cost of recycling the rubber and therefore reduces its desirability in suck applications.

A rubber barrier has been proposed in U.S. Pat. No. 5,106,554 to Drews which does not require the removal of wire from the recycled tires as follows. Tires are cut up into small squares and inserted within a mould in a wire cage. The cage is suspended away from the sides of the mould and the gap between the gap and the wire cage is filled with new rubber material. The barrier thus formed has solid new rubber envelope and an internal wire cage filled with pieces of discarded tire carcasses.

The Drews barrier suffers from several disadvantages. On severe impact, the barrier may become damaged, for example by ripping the exterior envelope from the central core. Due to the non-homogenous nature of the barrier, it is very likely that an impacting vehicle will merely rip off the outside skin of the barrier to reveal the interior wire cage and pieces of discarded tires therein. To repair the Drews barrier the moulding process must be carried out over again.

The Drews barrier also requires a wire cage to contain the recycled tire pieces during the moulding of the barrier. Added manufacturing steps and cost result from the construction of the cage, the filling of the cage (most likely done manually), and the insertion of the cage within the mould results in added costs and time taken to manufacture or re-manufacture the barriers.

The requirement of a cage also limits the shapes which a barrier may be formed using the Drews method. The requirement to include an internal cage however imposes a further restriction not only on the shape of the mould but also on a corresponding shape of cage required.

Prior conventional rubber barriers have also included wire cages or reinforcing to increase the resistance to the impacting vehicles. An example of a traffic control bumper guard rail is described in U.S. Pat. No. 3,317,189 to Rubenstein. A rubber and stone aggregate concrete composition is mixed in the process described in Rubenstein and the rubber concrete composition is encased within a wire reinforced envelope. Recycled rubber may be used in such an application however the use of a separate envelope and reinforcing wires add significantly to the cost of such a bumper.

The Rubenstein bumper suffers from the same disadvantage as the Drews barrier in that the bumper may be easily damaged on impact and must be removed and replaced. Due to the wire cage and complex construction of the bumper it is unlikely that salvaging the bumper material would be economical.

In the case of all prior art rubber barriers, integration of the rubber barrier into existing barrier structures is not contemplated. Instead, the rubber barriers of the prior art require that a separate structure be constructed, consuming additional space or removal of existing structures.

Therefore it is desirable to produce a rubber highway barrier which uses discarded waste tires preferably in a manner which does not require the removal of reinforcing steel from the discarded tires.

It is desirable that the content of new material used in such a barrier is minimized, to consume a maximum amount of recycled waste and to eliminate reinforcing structures which complicate fabrication, impede recycling efforts and add cost.

It is also desirable to produce a rubber barrier which may be itself recycled if damaged on impact with a vehicle.

It is also desirable to be able to form a rubber barrier in any selected shape. Preferably the rubber barrier should be easily integrated into existing concrete barrier modules, or assemblies of modules.

SUMMARY OF THE INVENTION

The invention overcomes the disadvantages of the prior art in a novel manner in the provision of a method of manufacturing a homogeneous solid rubber vehicular barrier, comprising the steps of: mixing and knead melting a mixture of: 80 to 90 percent by weight particles of recycled waste rubber; 10 to 20 percent by weight virgin rubber; and an accelerator composition; forming the mixture in a mould to a selected barrier configuration thus forming a barrier; curing the mixture within the mould at a temperature of 250 to 450° C. at a pressure of 500 to 1000 psi for a period of time from 1.5 to 7.5 hours; and removing the cured barrier from the mould.

A homogeneous moulded solid rubber vehicular barrier is thereby formed of 80 to 90 percent by weight particles of recycled waste rubber in a matrix of 10 to 20 percent by weight virgin rubber. The completed barrier has a finished outer surface of cured uncontaminated rubber, and has a Shore hardness of between 65 and 70.

The novel construction of the vehicular barrier according to the invention provides numerous advantages over conventional barriers.

The use of discarded waste tires is advantageous in that waste tires present significant environmental and fire hazard problems. The use of rubber for a highway barrier avoids the danger of sparks igniting fuel which leaks from vehicles during impact. The solid rubber also yields a limited degree on impact but does not permanently deform or require re-construction after an impact.

The homogenous nature of the rubber barrier is particularly advantageous in that a damaged barrier may be itself easily recycled. It is not necessary to remove the wire from shredded recycled tires since the pressure of forming the barriers in a mould results in an outer surface of pure uncontaminated rubber with the wire particles within the interior of the barrier.

since the barriers are formed of a homogeneous rubber mixture they can be formed in any desirable shape in a mould with minimal difficulty. As a result, the rubber mould can be made to mimic the shape of conventional concrete barrier modules. Different styles and shapes of concrete barriers are used in different areas by various highway authorities. Adapting to the existing barrier configuration that has been traditionally used by a user, rather than attempting to convince a user to adopt a new configuration, significantly improves the likelihood of marketplace acceptance.

Such flexibility in design enables a highway authority to gradually replace existing concrete modules or to replace concrete modules with rubber modules of identical configuration in areas where vehicular accidents repeatedly occur.

The capacity to mimic the configuration of conventional concrete barriers is particularly advantageous when such barriers are used for temporary protection during construction. Concrete barriers are handled numerous times and often become chipped, broken and unsightly due to repeated handling. The temporary barriers are often handled in a rough manner, and may be dropped or bumped during repeated lifting and positioning. A rubber module of the identical shape can be used numerous tines for temporary placement without the danger of damage or cracking due to such rough handling.

If the rubber barriers become damaged through repeated rough handling or after severe impact with a vehicle, the barrier may be removed and reground into shredded rubber. The shredded rubber may be reused as raw material for a replacement barrier. As such the barrier itself is easily recyclable due to its homogeneous nature. True recycling is therefore achieved since the cycle of use and reuse can continue indefinitely.

Further aspects of the invention will become apparent upon review of the following detailed description.

BRIEF DESCRIPTION OF THE DRAWINGS

In order that the invention may be readily understood, a preferred embodiment of the invention will be described by way of example with reference to the accompanying drawings in which.

DETAILED DESCRIPTION OF PREFERRED EMBODIMENTS OF THE INVENTION

Figure 1:
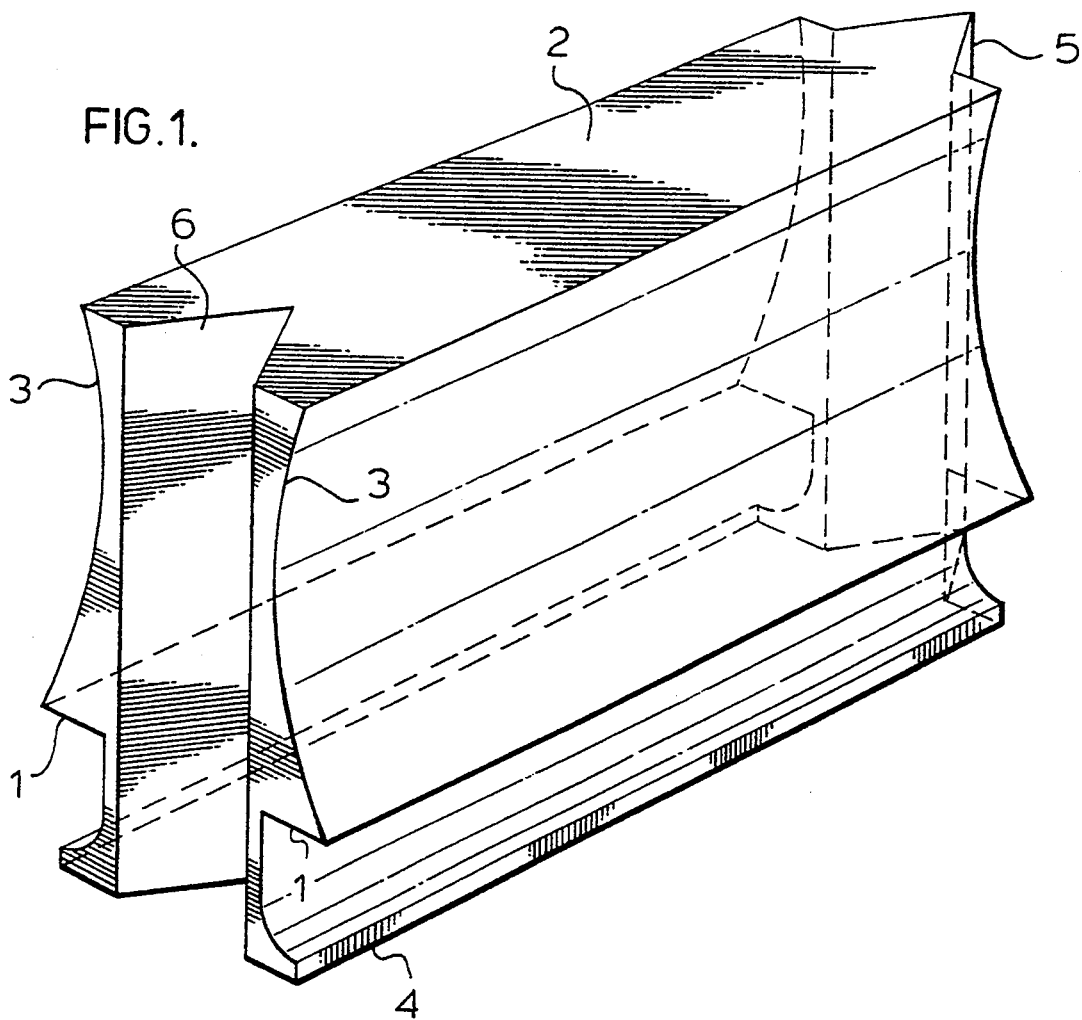
FIG. 1 is an isometric view of a solid rubber highway median barrier module in accordance with the invention.

With reference to FIG. 1 a preferred configuration of solid rubber vehicular barrier and a method of manufacturing the barrier will be described in detail below.

The barrier has the advantage that it may be manufactured using recycled waste tire rubber in the form produced directly by milling waste tires without further processing. Therefore the recycled tires need only be shredded, or frozen or crumbled, in a known manner to produce raw material which comprises the bulk of the barrier. The recycled waste tire rubber contains shredded metal reinforcing from the tire, however as described below, such metallic contaminants do not materially effect the performance or durability of the resulting barrier.

Since the barriers are of homogeneous solid rubber with metallic contaminants distributed uniformly throughout, the barrier itself may be recycled if damaged or a different shape of barrier is required. The barrier may be shredded in the same manner as recycled waste tires, mixed with further recycled tires or virgin rubber as desired to obtain the required composition.

The homogeneous solid rubber vehicular barrier is manufactured first by mixing and knead melting a mixture of 80 to 90% by weight particles of recyled waste rubber with 10 to 20% by weight virgin rubber. An accelerator composition is added to the mixture and the step of mixing and knead melting is carried out in a conventional Banbury mixer until the mixture acquires a dough-like consistency.

As in the production of virgin rubber using an accelerator, is has been found that no heat is required to achieve thorough mixing and knead melting. It is believed that the virgin rubber coats the waste rubber particles and the mixed components melt together at the particle boundaries. As a result, the virgin rubber creates a matrix within which the waste rubber particles are suspended. The waste rubber therefore need not fully melt with the virgin rubber but rather may be suspended in a virgin rubber matrix in a manner analogous to the suspension of stone aggregates in a liquid Portland cement-sand matrix in concrete.

The mixture is then inserted within a mould. The mould is of the type used in vehicle tire production being a cast aluminum mould with means to distribute pressure and heat within the mould.

The mixture within the mould is formed under pressue to a selected barrier configuration thus forming the homogeneous solid rubber barrier.

The mixture within the mould is cured at a temperature between 250° to 450° C. under a pressure of from 500 to 1000 psi (pounds per square inch) for a period of time from 1.5 to 7.5 hours. The precise temperature, pressure and period of time will depend upon the selected configuration of the barrier, the selected proportion of recyled waste rubber to virgin rubber chosen for the mixture, humidity, and other factors well known to those in the relevant art.

As in other forms of rubber moulding a certain amount of experimentation is required to determine the optimum conditions for curing any shape and composition of rubber product manufactured.

In order to obtain a Shore hardness for the barrier of between 65 to 70, in respect of the specific embodiment shown in FIG. 1, the preferred optimal perameters are as follows. The preferred mixture comprises 87 to 89% waste rubber and 11 to 13% virgin rubber. The preferred temperature is from 325° to 375° C. and the optiminal pressure is between 700 and 800 psi Given the above parameters, the period of time for curing is approximately four to five hours.

It is anticipated that barriers of between 13 and 17 tons mass can be formed and handled without difficulty. It will be appreciated that it is desirable to produce barriers as long as possible in order to minimize the number of interlocking connections between barriers which tend to weaken the longitudinal series of interconnected barriers.

After the barrier has cured for the required time in the mould, the barrier is removed from the mould and the manufacturing process may be repeated.

If desired, coloured pigments may be added to the mixture during the mixing step. Also optionally magnetic metallic contaminants may be removed from the recycled waste rubber particles prior to the mixing step by passing over magnetic belts for example.

In the preferred method of manufacturing however the metallic contaminants such as wire from recycled tires, need not be removed. The heat and pressure of the moulding and curing process tends to draw liquid virgin rubber and melted waste rubber toward the mould surfaces and the unmelted particles of recycled waste rubber and shredded metallic contaminants therein migrate away from the mould surfaces. As a result the finished surfaces of the barrier when it is removed from the mould exhibit the properties of uncontaminated cured rubber.

However if one cuts into the interior of the barrier, the metallic contaminants will be apparent on close examination. The metallic contaminants are in fact beneficial in adding to the inertial mass of the barrier which resists the impact forces of vehicles. The shredded wire of recycled tires acts as tensile and shear reinforcing which increasees the resistance to cracking or splitting if distributed uniformly throughout the barrier in much the same manner as glass fibres or asbestos fibres are used in certain applications of fibre reinforced concrete.

The resulting homogeneous moulded solid rubber vehicular barrier therefore comprises 80 to 90% by weight of particles of recycled waste rubber. The manufacture of such vehicular barriers therefore represents a significant means to consume what is otherwise a troublesome waste product.

The invention is particularly advantageous in that the metallic contaminants need not be removed from the recycled waste rubber in such an application. Other applications of recycled waste rubber from automobile tires require the removal of metallic contaminants before the rubber can be recycled. Such alternative applications are inclusion in asphalt compositions, resilient pavements for athletic facilities and playgrounds, and bedding compositions for animal pens where the inclusion of the metallic contaminants is dangerous or extremely undesirable. The waste rubber must be milled to a finer size to release the metal components, and the waste rubber must be further processed to remove the metal.

The inclusion of 10 to 20% by weight of virgin rubber enables the mixture to achieve the desired consistency which will result in a finished moulded surface substantially the same as if virgin rubber were used throughout. The optimal percentage of virgin rubber in the mixture also results in complete bonding of recycled waste rubber particles in a matrix of virgin rubber.

The recycled waste rubber particles may be purchased in bulk from existing vehicular tire recycling plants. Commonly the rubber particles are milled to a maximum dimension less than or equal to ⅜ of an inch. Another common source of recycled waste rubber particles are particles which have been reclaimed from the buffing of vehicular tires during retreading operations. In both cases the waste rubber particles may contain significant amounts of various contaminants such as oil, grease, sand and soil. The use of virgin rubber in the mixture together with such contaminated waste rubber eliminates the need to purify the recycled waste rubber since all such contaminants and the recyled waste rubber are suspended within a matrix of new virgin rubber.

As shown in FIG. 1 a barrier preferably mimics the shape of conventional concrete barriers having an elongate body of uniform cross-section. Conventional concrete barriers have a substantially trapezoidal shape with a base top surface and two planar inclined side surfaces.

In the embodiment illustrated in FIG. 1 the preferred cross-section is shown as substantially trapezoidal having a base 1 which is at the elevation at the top surface of the roadway within which the barrier is embedded. A flat top surface 2 is provided to which conventional reflectors or railings may be attached. The two inclined side surfaces 3 are shown as concave in the embodiment illustrated however it will be apparent that planar side surfaces or any desired shape and pattern may be moulded using the method described above.

The barrier illustrated also includes a pedestal 4 which is provided in order to embed the barrier within the roadway if desired. The embedding of the pedestal 4 within the roadway increases the resistance to vehicular impact loads, however embedment also complicates installation and repair.

Alternatively, the pedestal 4 may be eliminated and the barrier may be simply placed on its base 1 upon the roadway surface after paving operations are complete. If the pedestal 4 is eliminated it is preferable to increase the overall dimensions of the barrier in order to provide a larger inertial mass to resist vehicular impact loads.

Figure 2:
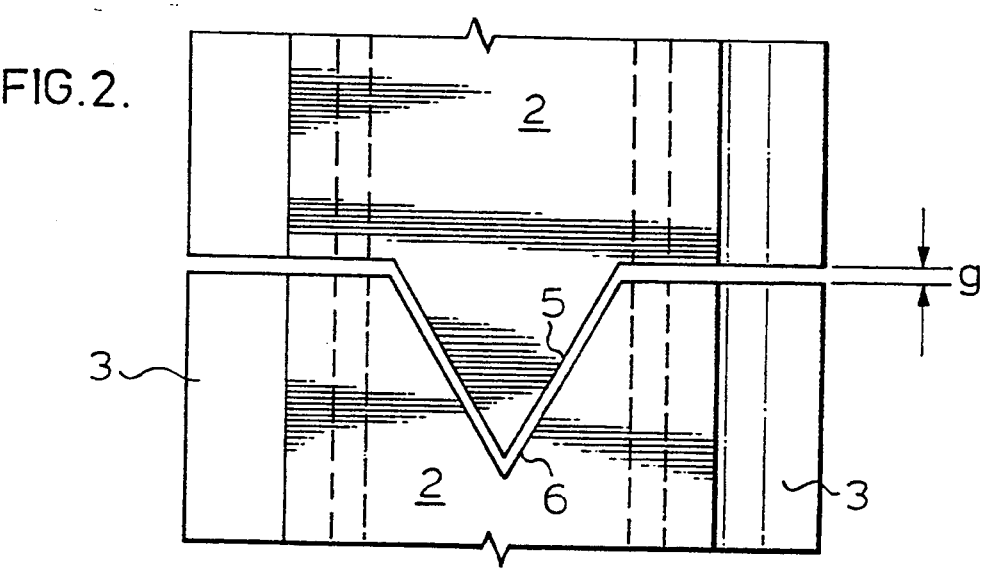
FIG. 2 is a plan detail view of the interconnection between adjacent barrier modules which are positioned end to end to form an elongate highway median barrier.

As shown in the detail of FIG. 2, the barrier preferably includes inter connecting means at longitudinally opposed ends of the barrier for interconnecting like barriers in a longitudinal series. Conventional concrete barriers include such interconnecting means as well and as stated above it is particularly advantageous to construct the solid rubber barriers to mimic the size, shape and interconnecting means of existing concrete barriers.

The barriers shown have interconnecting means which comprise a mating tongue 5 and groove 6 with a substantially triangular cross section. The tongue 5 and groove 6 have a substantially triangular horizontal cross-section as best shown in FIG. 2. Lateral loads from impacting vehicles therefore are resisted by the shear resistance of the tongue 5. Expansion and contraction of the individual barrier modules is accomodated by providing a gap "g" between like interconnecting barriers in a longitudinal series.

It will be apparent therefore that the barrier manufactured in accordance with the invention described above has several advantages over conventional roadway barriers. The impact of a colliding vehicle and scraping along the surface of the solid rubber barrier will not result in the creation of sparks. Therefore the danger of igniting spilled fuel after an impact is substantially reduced.

The coefficient of friction between a solid rubber barrier and a metallic vehicle is substantially higher than the coefficient of friction between a solid concrete barrier and a sliding metallic vehicle. A braking action results therefore from the sliding of the vehicle on the solid rubber barrier, stopping the vehicle in a shorter distance than would be achieved with a relatively slippery hard concrete surface.

Waste automobile tires may be used in the form which they are produced directly from a mill. It is not necessary to further refine the waste rubber particles by removing metallic contaminants as is required in substantially all other applications of recycled tire rubber.

The homogeneous solid rubber vehicular barrier constructed in accordance with the invention does not require any internal reinforcing wires or cages as required in conventional rubber barriers described above. Therefore the barrier may be formed in one step in a mould in a simple manner in any desired shape.

Preferably the chosen shape for the rubber barrier is identical to existing concrete barriers which are to be replaced. For example if a particular area of concrete barrier experiences a high number of vehicular impacts, that area of the medium may be replaced with solid rubber barriers in accordance with the invention. Likewise if a highway authority wishes to replace existing concrete barriers as they become damaged in a piece by piece method, moulded rubber barriers which mimic the shape of existing concrete barriers may allow the distribution of the cost of replacement over time.

Solid rubber vehicular barriers are particularly advantageous when used for construction purposes since such barriers are repeatedly moved and are subject to chipping or cracking damage. The flexibility and resilient nature of solid rubber barriers is well suited to such an application.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A method of manufacturing a homogeneous solid rubber vehicular barrier, comprising the steps of:
   mixing and knead melting a mixture of:

80 to 90 percent by weight particles of recycled waste rubber;

10 to 20 percent by weight virgin rubber; and an accelerator composition;

forming the mixture in a mould to a selected barrier configuration thus forming a barrier wherein the barrier has an elongate body of uniform cross section, said cross section being substantially trapezoidal having a base, a top surface and two inclined concave side surfaces;

curing the mixture within the mould at a temperature of 250° to 450° C at a pressure of 500 to 1000 psi for a period of time from 1.5 to 7.5 hours wherein said barrier when fully cured has a finished outer surface of cured uncontaminated rubber, and has a Shore hardness of between 65 to 70; and removing the cured barrier from the mould.

2. A method according to claim 1 wherein the mixture comprises 87 to 89 percent said waste rubber and 11 to 13 percent said virgin rubber.

3. A method according to claim 1 wherein the temperature is from 325° to 375° C.

4. A method according to claim 1 wherein the pressure is from 700 to 800 psi.

5. A method according to claim 1 wherein the period of time is from 4 to 5 hours.

6. A method according to claim 1 including the step of adding colouring pigments to the mixture during the mixing step.

7. A method according to claim 1 including the step of magnetically removing metallic contaminants from the recycled waste rubber particles prior to said mixing step.

8. A homogeneous moulded solid rubber vehicular barrier, comprising:

80 to 90 percent by weight particles of recycled waste rubber; and 10 to 20 percent by weight virgin cured uncontaminated rubber, and has a Shore hardness of between wherein said barrier has a finished outer surface of between 65 to 70 and wherein the barrier has an elongate body of uniform cross section, said cross section being substantially trapezoidal having a base, a top surface and two inclined concave side surfaces.

9. A barrier according to claim 8 having a mass of between 13 and 17 tons.

10. A barrier according to claim 8 wherein the recycled waste rubber particles contain metallic contaminants, and the finished outer surface is free of said metallic contaminants.

11. A barrier according to claim 8 wherein the recycled waste rubber particles comprise reclaimed particles of vehicular tires of a maximum dimension less than or equal to ⅜ the of an inch.

12. A barrier according to claim 8 wherein the recycled waste rubber particles comprise particles reclaimed from buffing of retread vehicular tires.

13. A homogeneous moulded solid rubber vehicular barrier, comprising:

80 to 90 percent by weight particles of recycled waste rubber; and 10 to 20 percent by weight virgin rubber; wherein said barrier has a finished outer surface of cured uncontaminated rubber, and has a Shore hardness of between 65 and 70 and wherein the barrier has an elongate body of uniform cross section including bottom pedestal means for embedment of the barrier.

14. A homogeneous moulded solid rubber vehicular barrier, comprising:

80 to 90 percent by weight particles of recycled waste rubber; and 10 to 20 percent by weight virgin rubber; wherein said barrier has a finished outer surface of cured uncontaminated rubber, and has a Shore hardness of between 65 to 70, the barrier including interconnecting means at longitudinally opposing ends of the barrier for interconnecting like barriers in a longitudinal series, wherein the interconnecting means comprise a mating tongue and groove of substantially triangular horizontal cross section.

* * * * *

UNITED STATES PATENT AND TRADEMARK OFFICE
CERTIFICATE OF CORRECTION

PATENT NO. : 5,336,016
DATED : August 9, 1994
INVENTOR(S) : BAATZ, Guenter Adolf It is certified that error appears in the above-indentified patent and that said Letters Patent is hereby corrected as shown below:

```
Claim 8, line 5 (column 9, line 38), after "virgin",
insert --rubber; wherein said barrier has a finished
outer surface of--.

Claim 8, line 7 (column 9, line 40), delete "wherein
said barrier has a finished outer surface of".

Claim 8, line 8 (column 9, line 41), delete "between".

Claim 8, line 8 (column 9, line 41), replace "to"
by --and--.

Claim 11, line 4 (column 10, line 13), replace "the"
by --ths--.
```

Signed and Sealed this

Eighth Day of April, 1997

Attest:

BRUCE LEHMAN

Attesting Officer

Commissioner of Patents and Trademarks